(12) United States Patent
Wong

(10) Patent No.: US 8,006,713 B2
(45) Date of Patent: Aug. 30, 2011

(54) AVIATION FUELING HYDRANT COUPLER WITH INTERNAL ACTUATING COLLAR LOCK

(75) Inventor: Tak-Yiu Wong, Cerritos, CA (US)

(73) Assignee: Eaton Corporation, Cleveland, OH (US)

( * ) Notice: Subject to any disclaimer, the term of this patent is extended or adjusted under 35 U.S.C. 154(b) by 260 days.

(21) Appl. No.: 12/211,680

(22) Filed: Sep. 16, 2008

(65) Prior Publication Data

US 2010/0065132 A1 Mar. 18, 2010

(51) Int. Cl.
*G05D 7/00* (2006.01)
(52) U.S. Cl. ............ 137/294; 251/95; 251/113; 285/85; 285/308; 285/315
(58) Field of Classification Search .................. 137/294, 137/272; 251/89, 95, 105, 107, 111, 113; 285/81, 84, 85, 308, 313–315
See application file for complete search history.

(56) References Cited

U.S. PATENT DOCUMENTS 4,078,577 A * 3/1978 Brown .......................... 137/614
4,303,093 A * 12/1981 Swindler .................. 137/315.01

* cited by examiner

Primary Examiner — Kevin L Lee
(74) Attorney, Agent, or Firm — Bradley J Dieorich

(57) ABSTRACT

A hydrant coupling assembly includes a hydrant valve and a hydrant coupler, including a coupler body and a coupler actuating collar assembly having an actuating collar movable axially relative to the coupler body. The actuating collar includes at least one movable latching lug that is selectively moved into place around a mating feature on the hydrant valve adapter by lifting or lowering the actuating collar. A locking mechanism is installed within the coupler actuating collar and includes a coupler plunger, a collar plunger, a coupler plunger check ball, and a collar plunger cheek ball. The coupler plunger and the coupler plunger check ball are adapted to lock the actuating collar in a disconnected state and the collar plunger and the collar plunger check ball are adapted to lock the actuating collar in a connected state. A hydrant coupler for use in a hydrant coupling assembly is also disclosed.

6 Claims, 15 Drawing Sheets

AVIATION FUELING HYDRANT COUPLER WITH INTERNAL ACTUATING COLLAR LOCK

BACKGROUND

In the aviation fueling industry, hydrant valves are installed in pit boxes below ground level and function both as a connection device and an on/off valve in the underground aviation fuel distribution system. A hydrant coupler is the other half of the connection system and controls fuel flow and fueling pressure during an aircraft refueling operation. In a typical connection system, the interface between the hydrant valve and the hydrant coupler is manually opened by the fueling operator using a handle on the hydrant coupler. When the hydrant coupler is opened, a face seal in the coupler engages a hydrant valve adapter to form a secure fuel flow path from the underground fuel pipes through the hydrant valve/coupler and into the aircraft.

To meet industry requirements, a secure latching mechanism is used to ensure that the hydrant coupler remains attached to the hydrant valve under an fueling pressures and flow. In one design, the latching mechanism utilizes an external actuating collar that drops in place under the force of gravity or a spring force to automatically latch the hydrant coupler to the hydrant valve. To disconnect the hydrant coupler, the fueling operator lifts the actuating collar to release the latching components. This type of actuating collar design presents a fuel leak risk should the interface seal fail during engagement and/or fuel flow. An interface seal failure would allow pressurized fuel leakage that may be sufficient to lift the collar and disengage the coupler. This disengagement may cause the hydrant valve poppet to quickly close and, in turn, create relatively high surge pressures within the hydrant valve sufficient to cause, among other things, a fuel spill.

To avoid fuel spills, hydrant couplers must be equipped with a lock mechanism that maintains the actuating collar in the connected position during connection and fueling. Existing collar lock designs place the collar lock on an external portion of the coupler. The fueling operator has to manually deactivate the lock in the process of lifting the actuating collar to disconnect the coupler.

To improve fueling ergonomics, fueling operators may use robotic connection devices to connect the hydrant coupler to the hydrant valve. These devices lessen the manual labor required to transport the hydrant coupler and fueling hose to the hydrant valve. Robotic connection devices are often incompatible with externally mounted actuating color locking mechanisms. As a result, fueling operators sometimes deactivate or remove the external collar locking device to enable robotic connection.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as a single component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
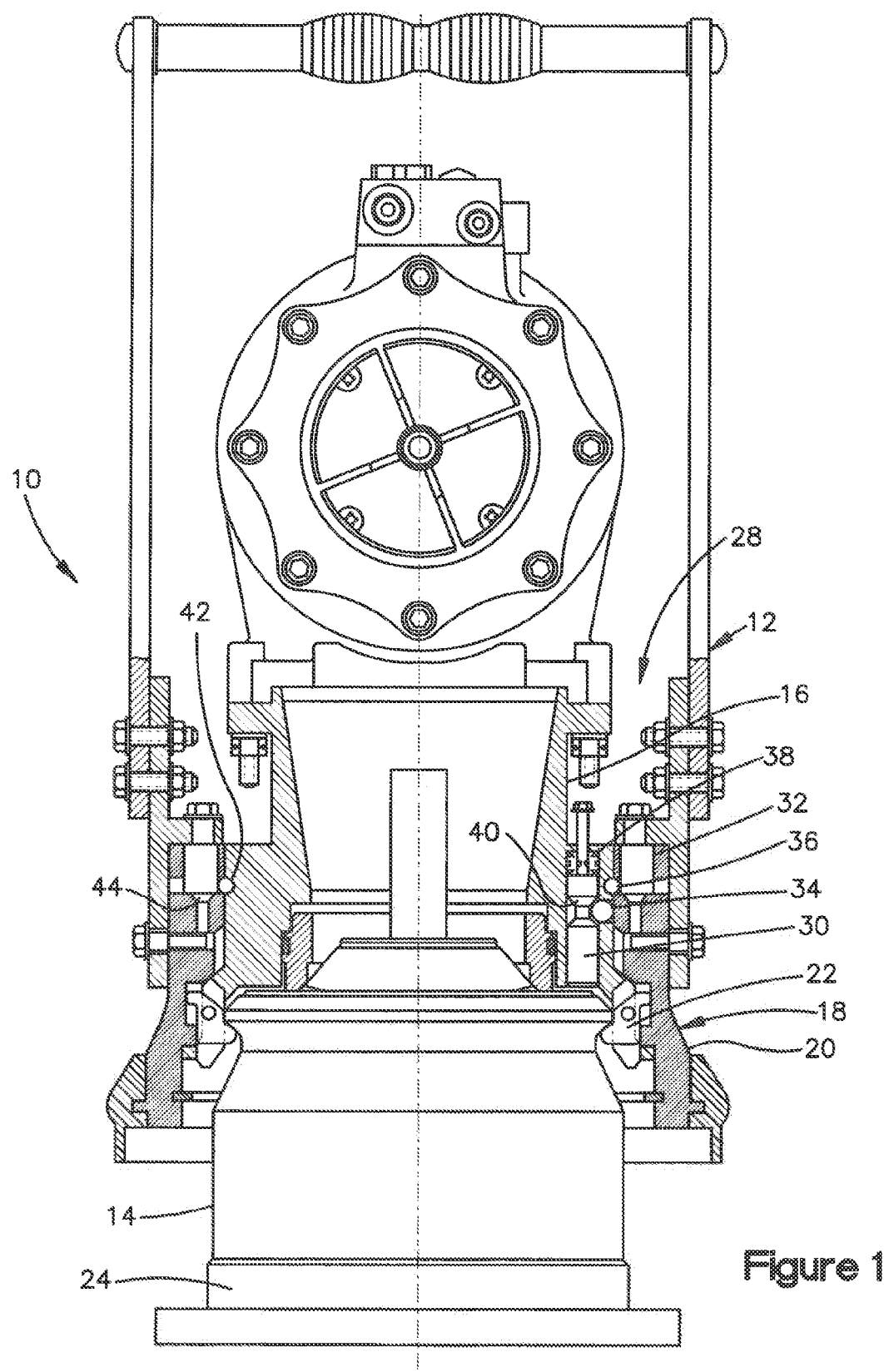
FIG. 1 is a partial cross-sectional view of a hydrant coupling assembly according to an embodiment of the present invention.
Figure 2:
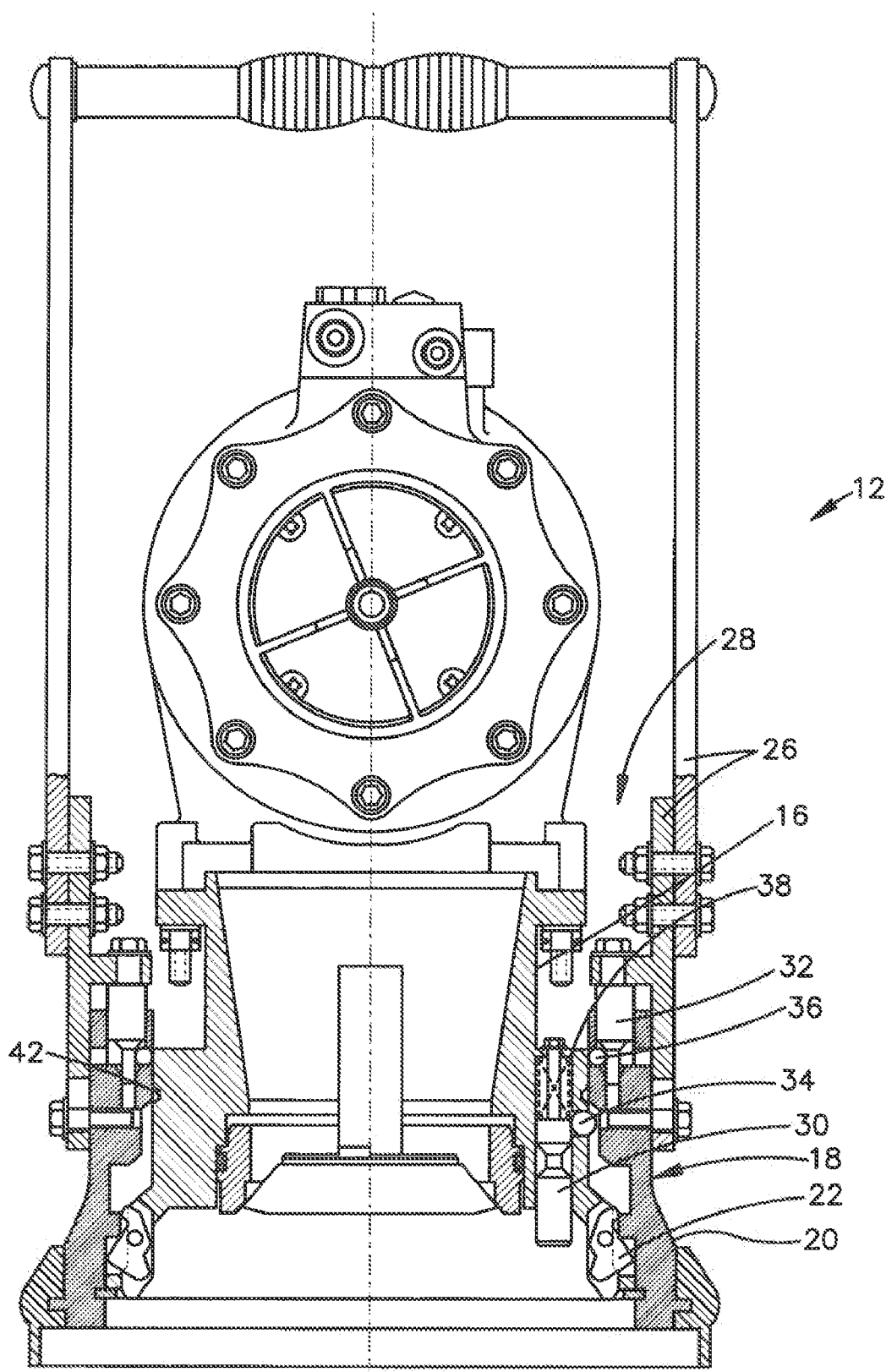
FIG. 2 is a partial cross-sectional view of a hydrant coupler according to an embodiment of the present invention for use in the hydrant coupling assembly of FIG. 1.
Figure 3:
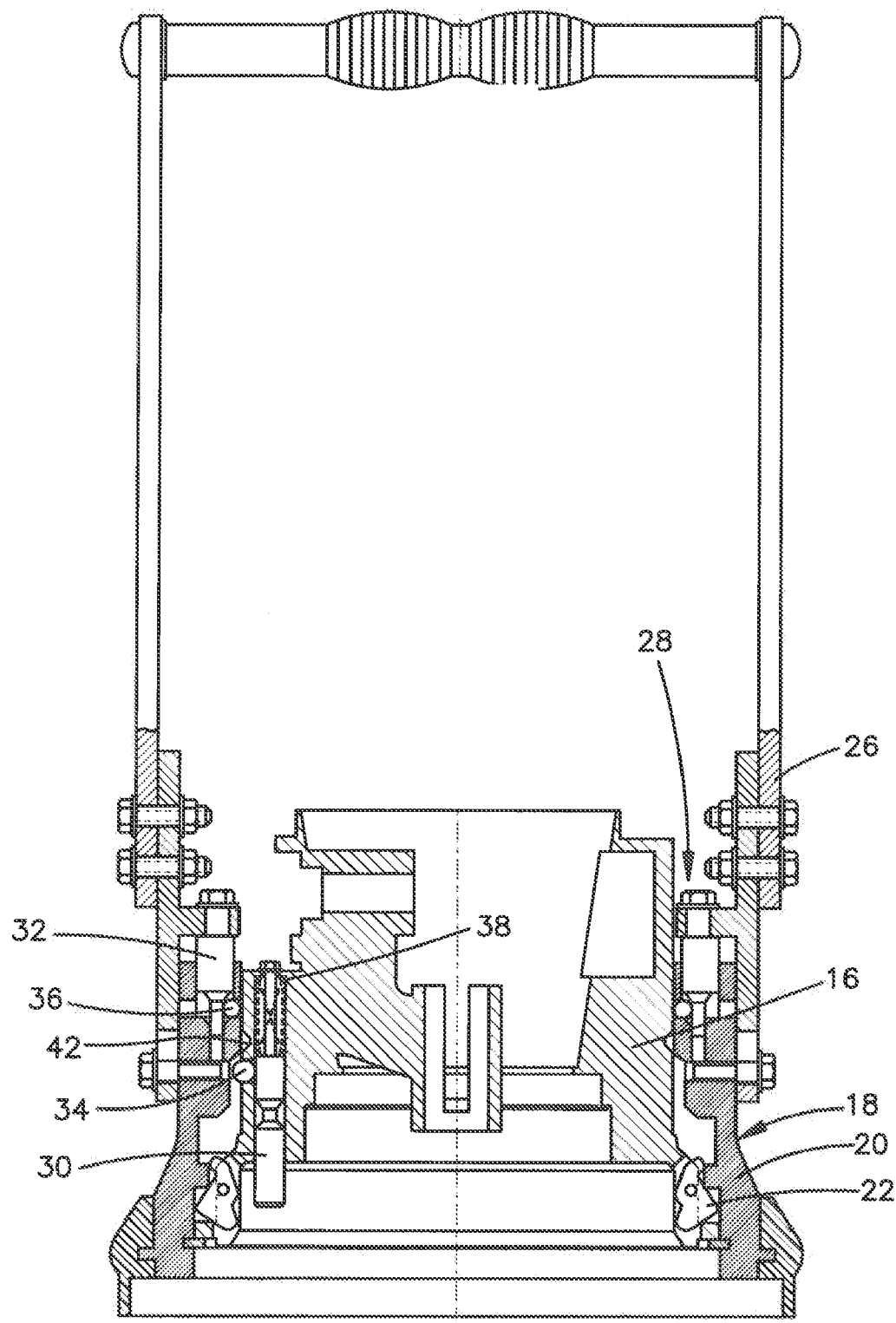
FIGS. 3-8 are illustrations of the hydrant coupling assembly of FIG. 1 shown during various stages of connection.
Figure 4:
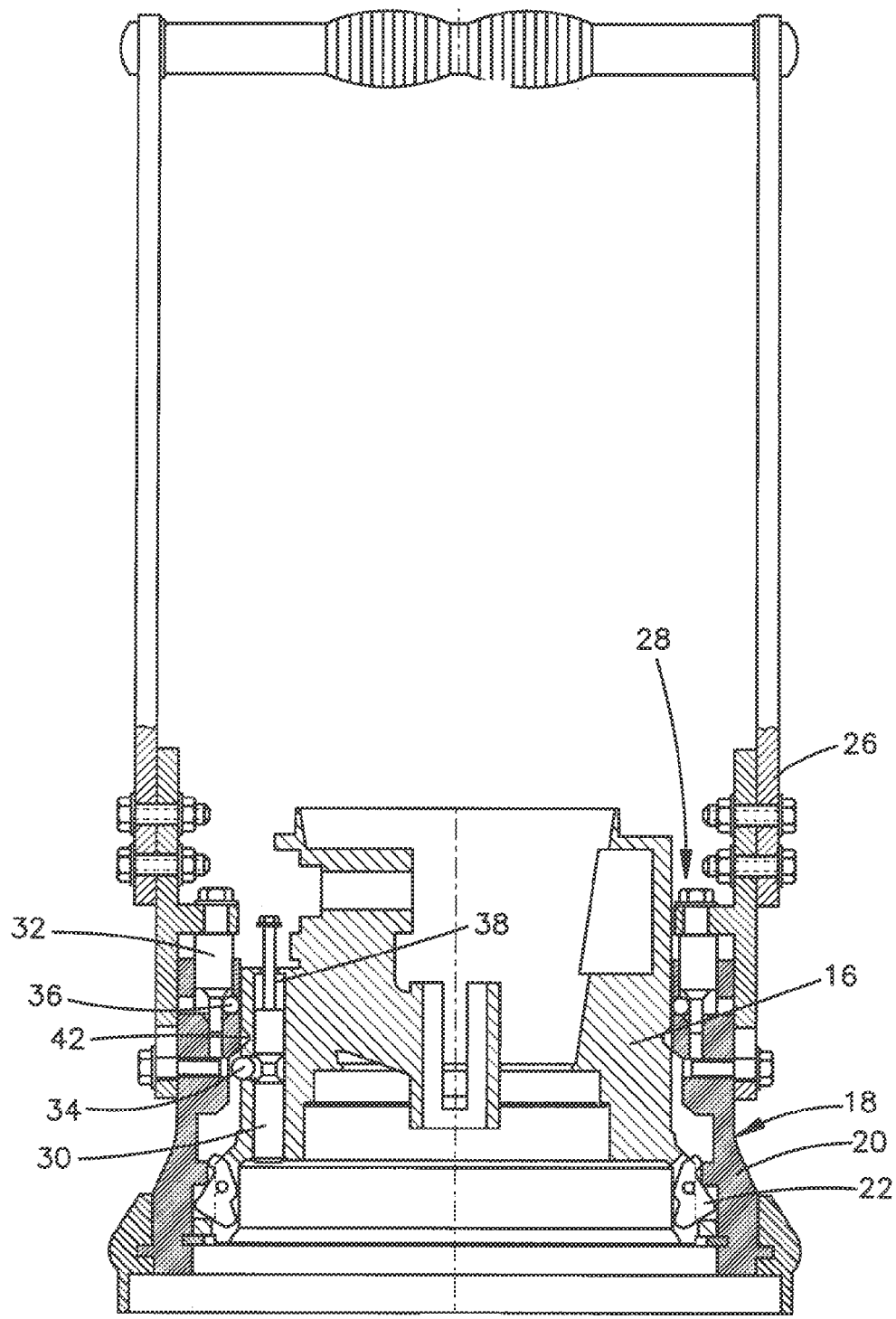
Figure 5:
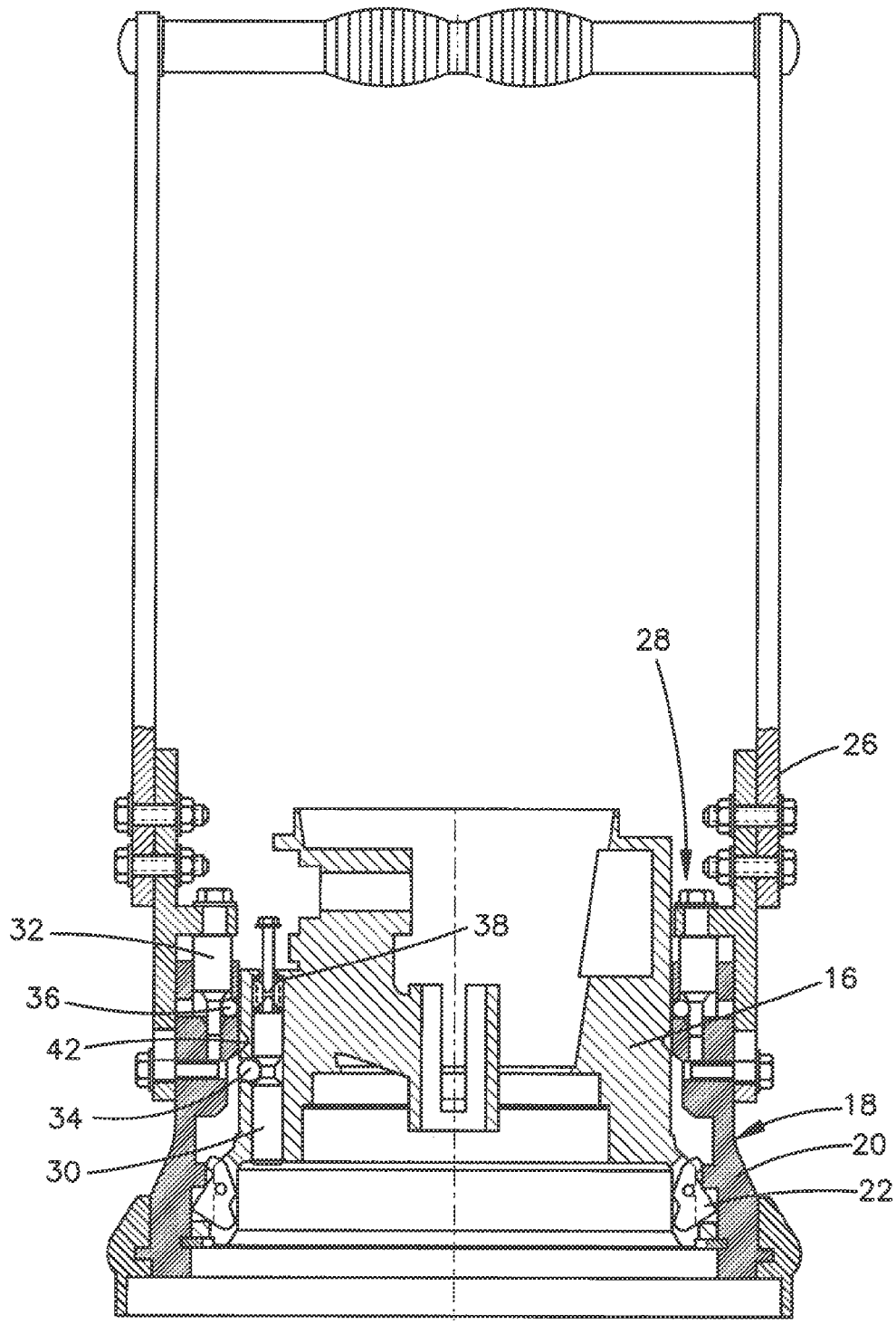
Figure 6:
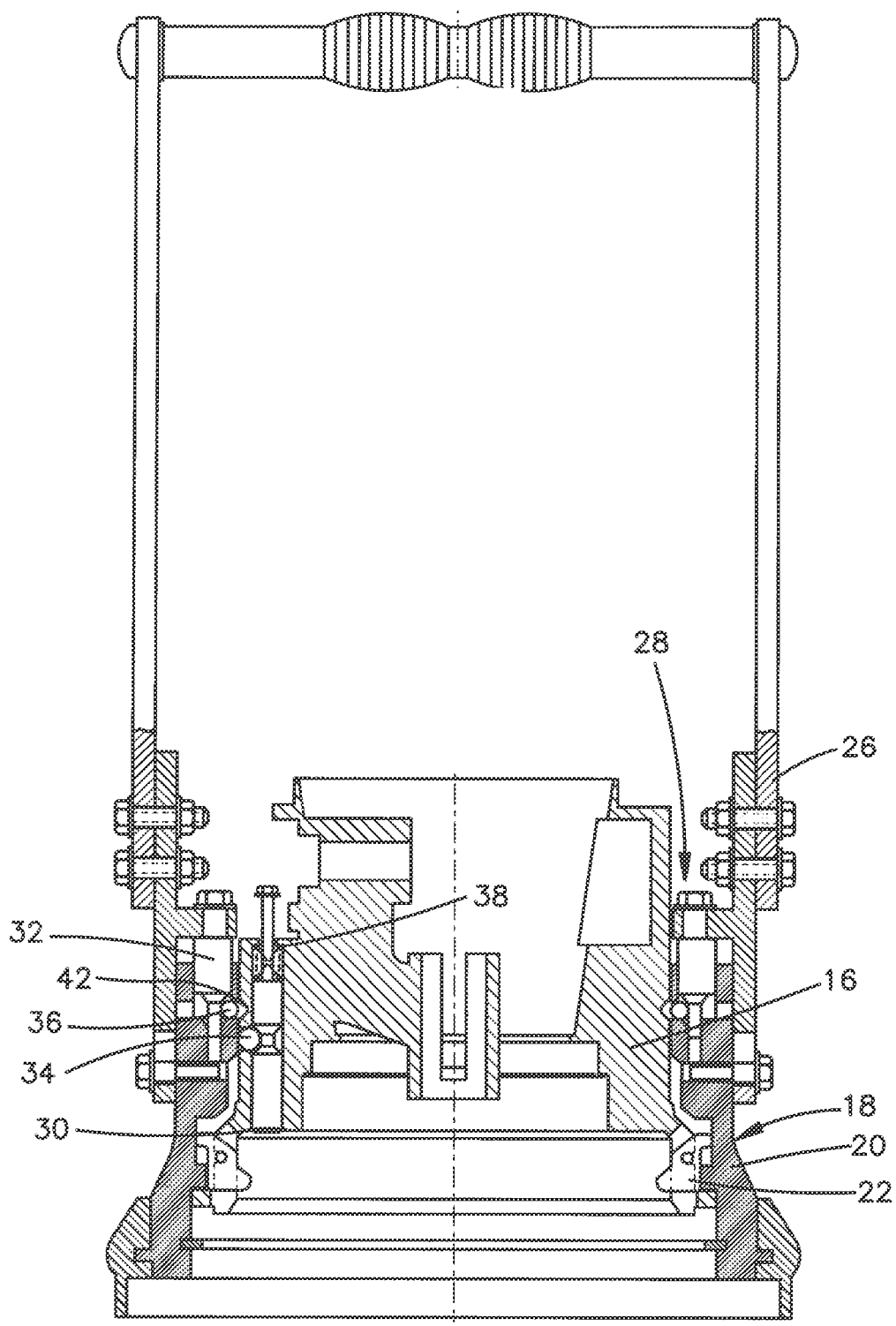
Figure 7:
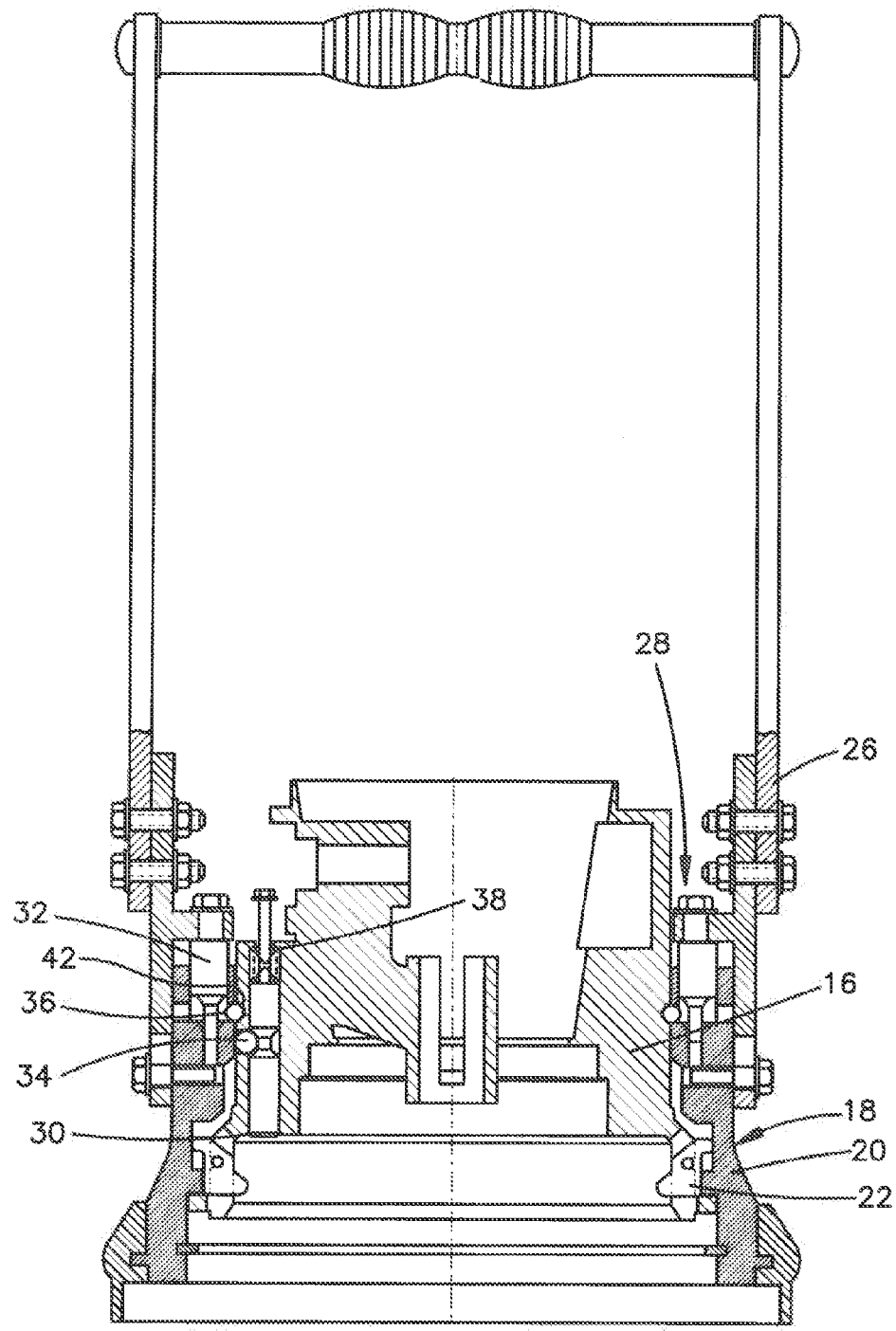
Figure 8:
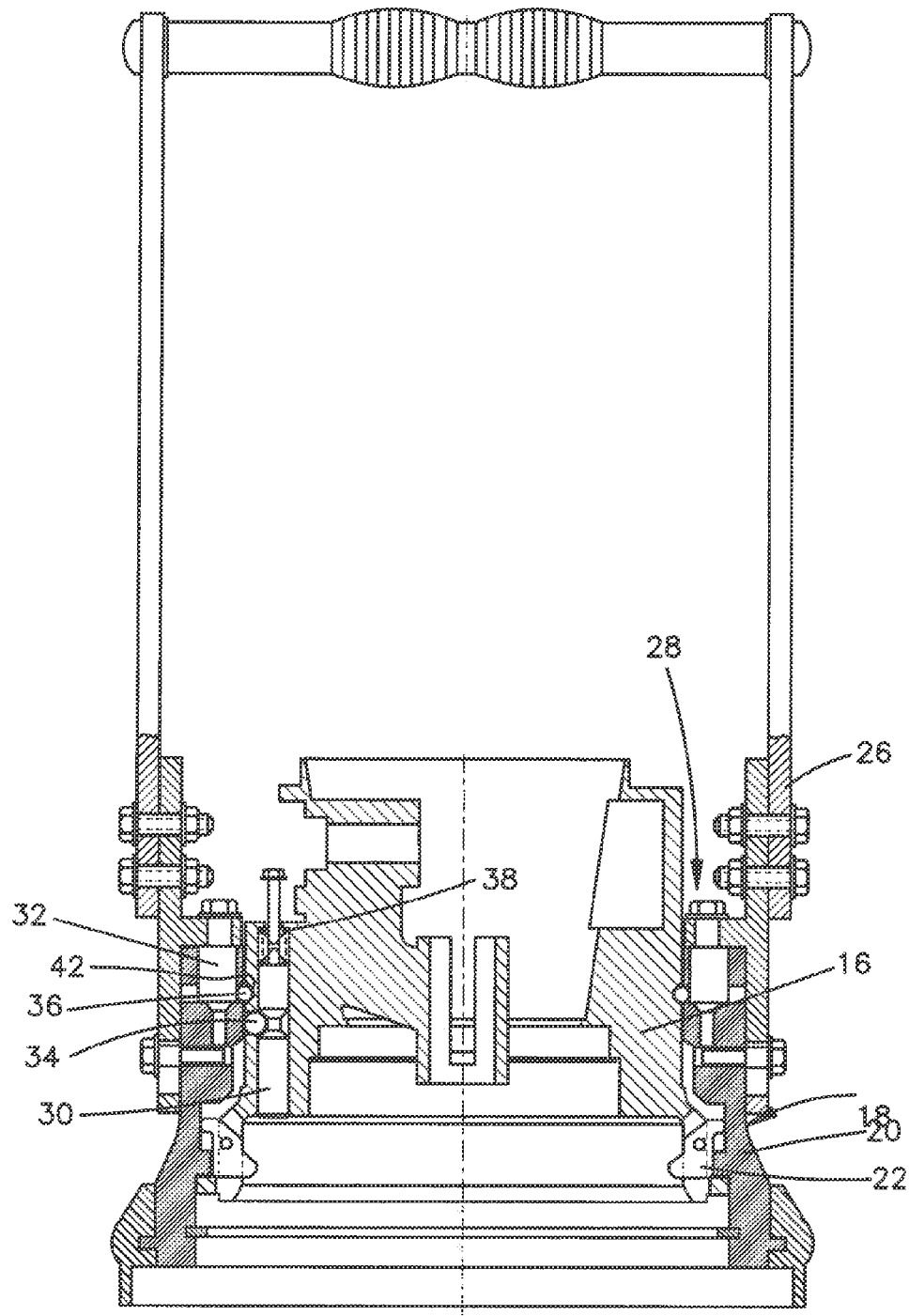
Figure 9:
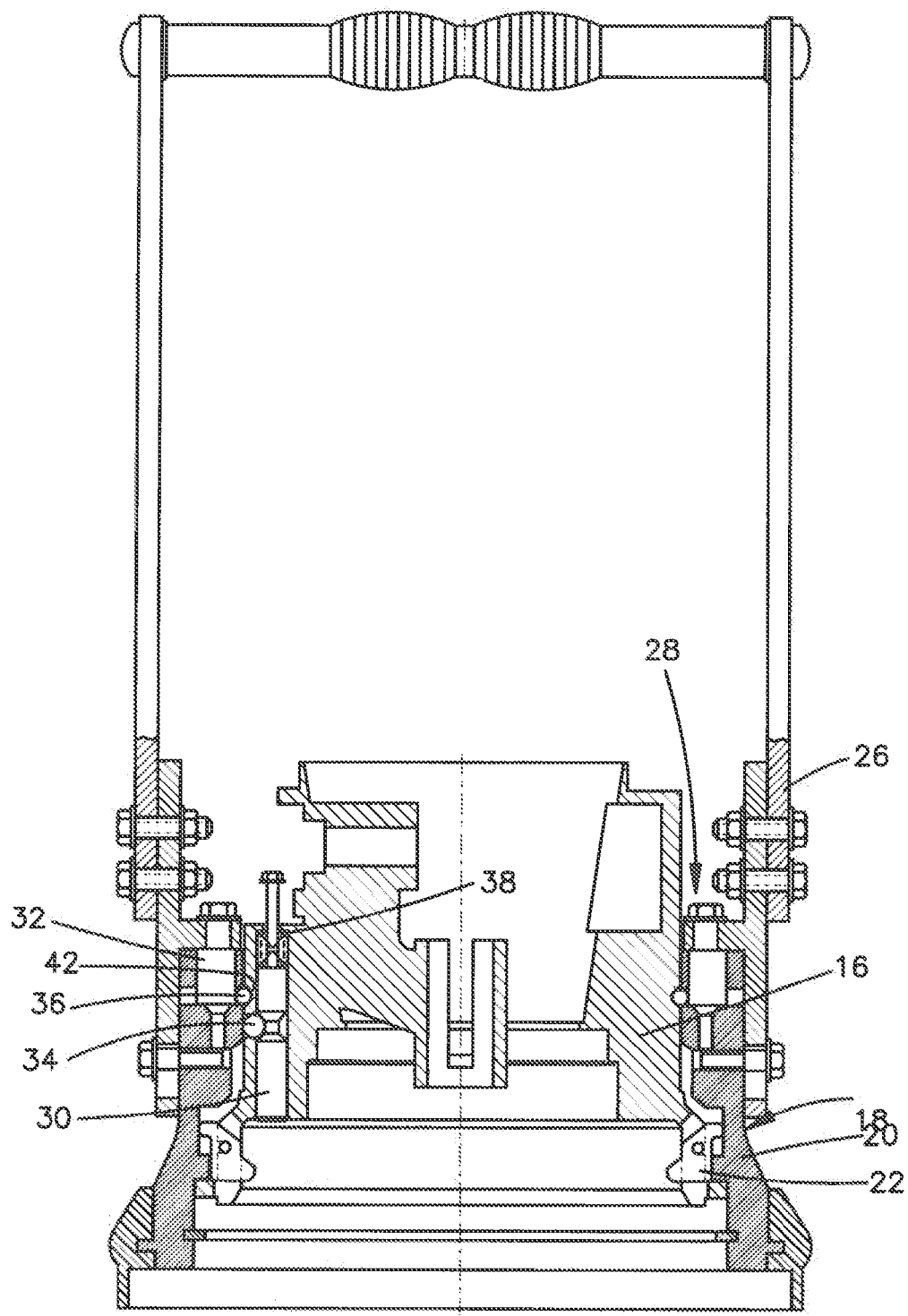
FIGS. 9-14 are illustrations of the hydrant coupling assembly of FIG. 2 shown during various stages of disconnection.
Figure 10:
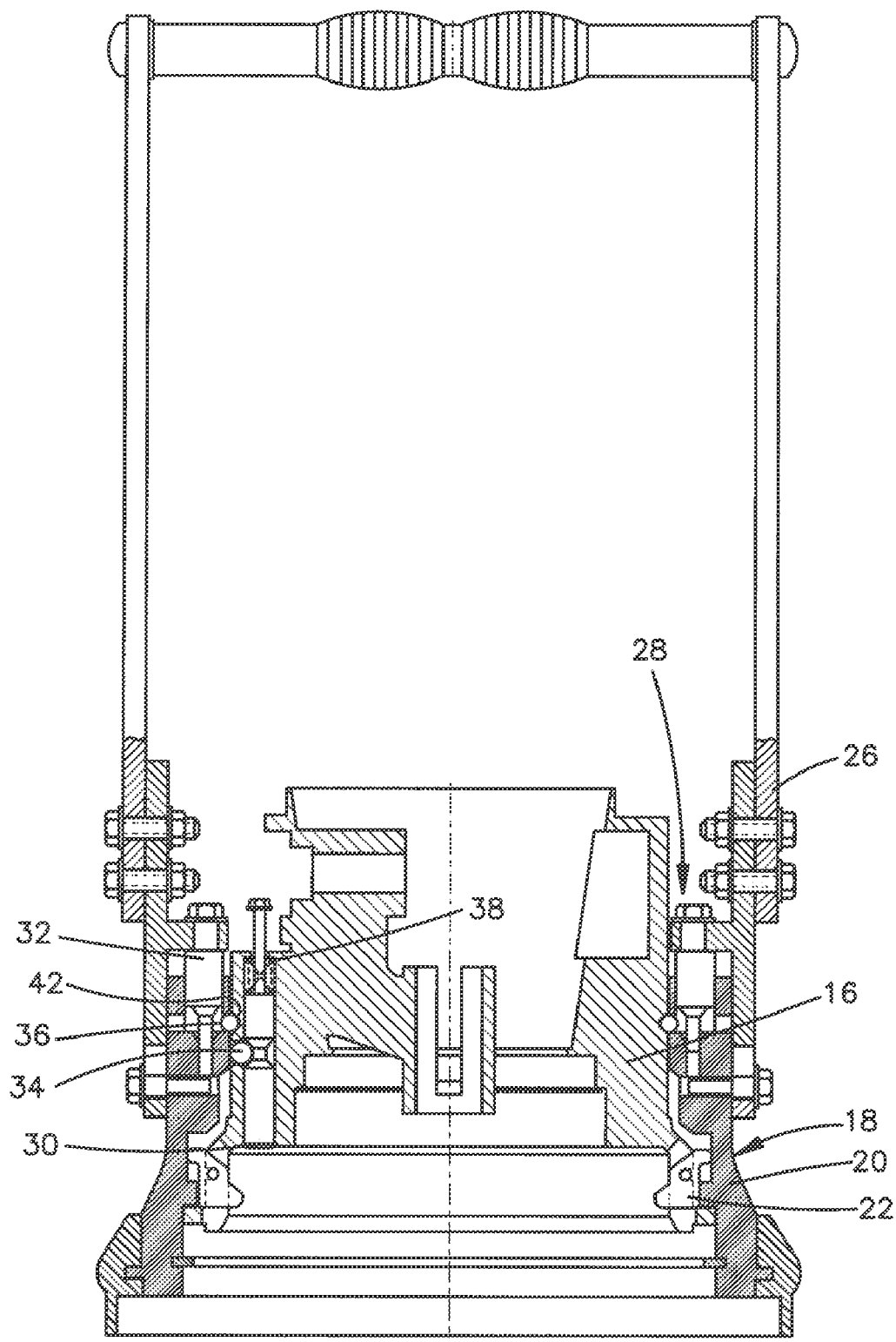
Figure 11:
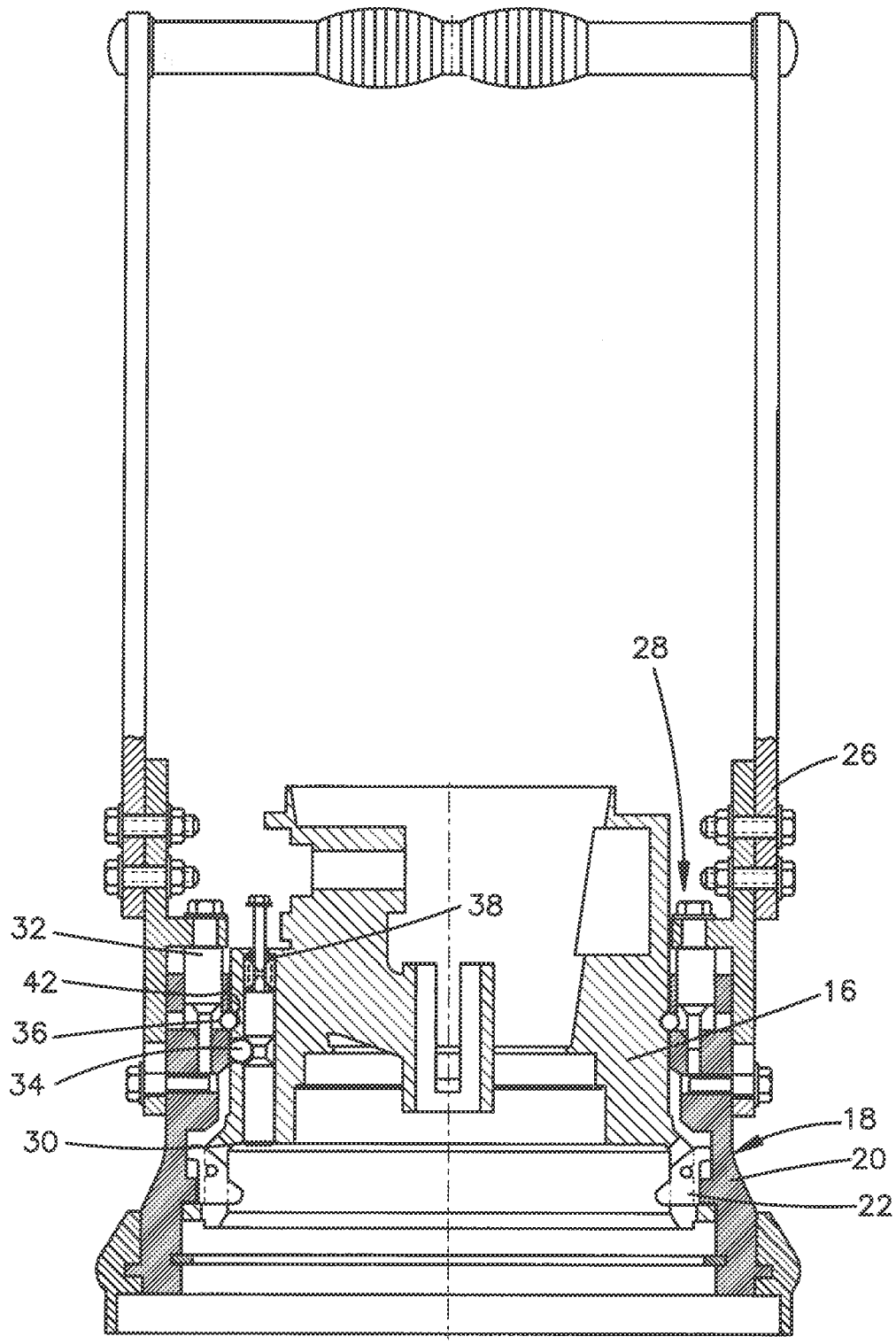
Figure 12:
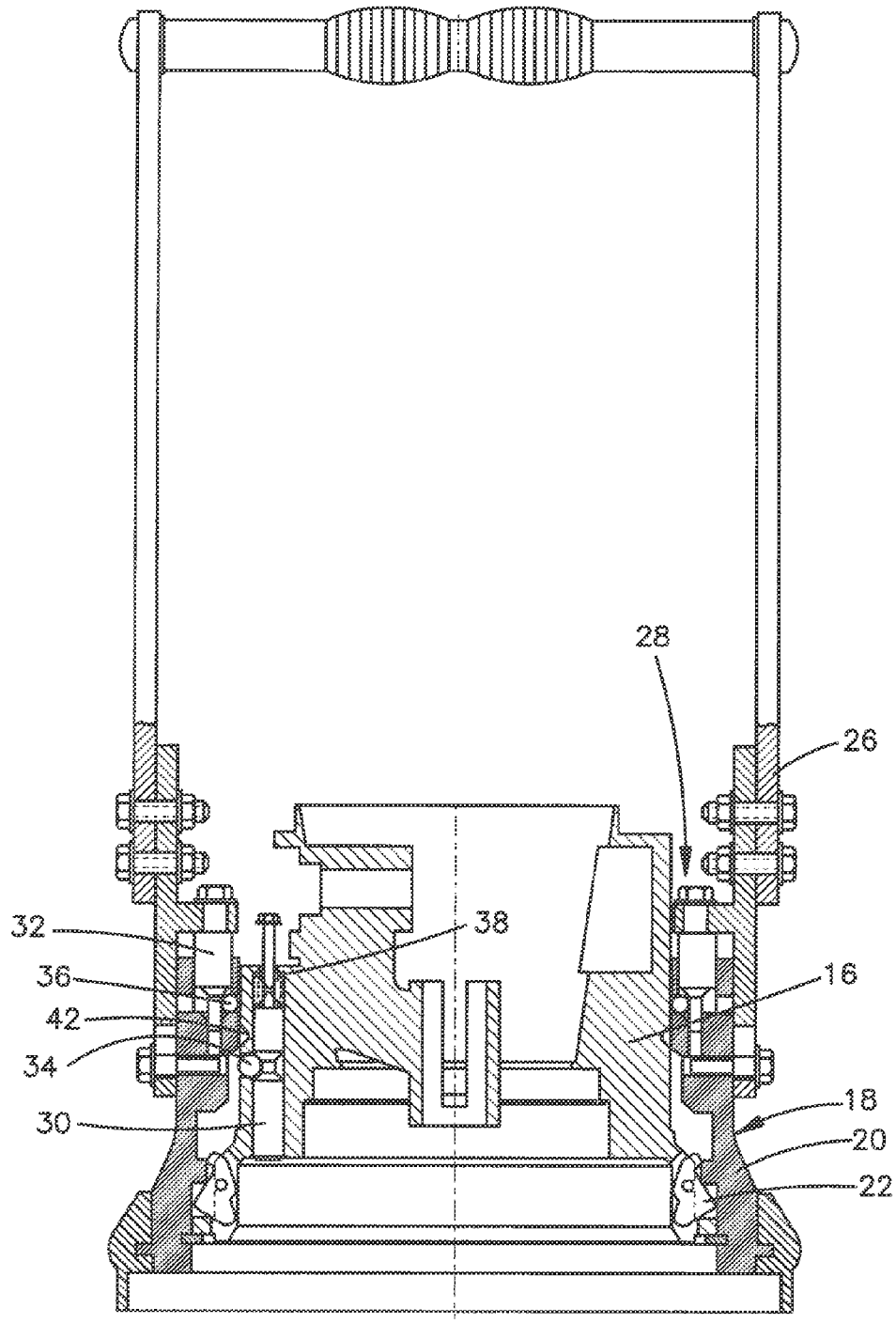
Figure 13:
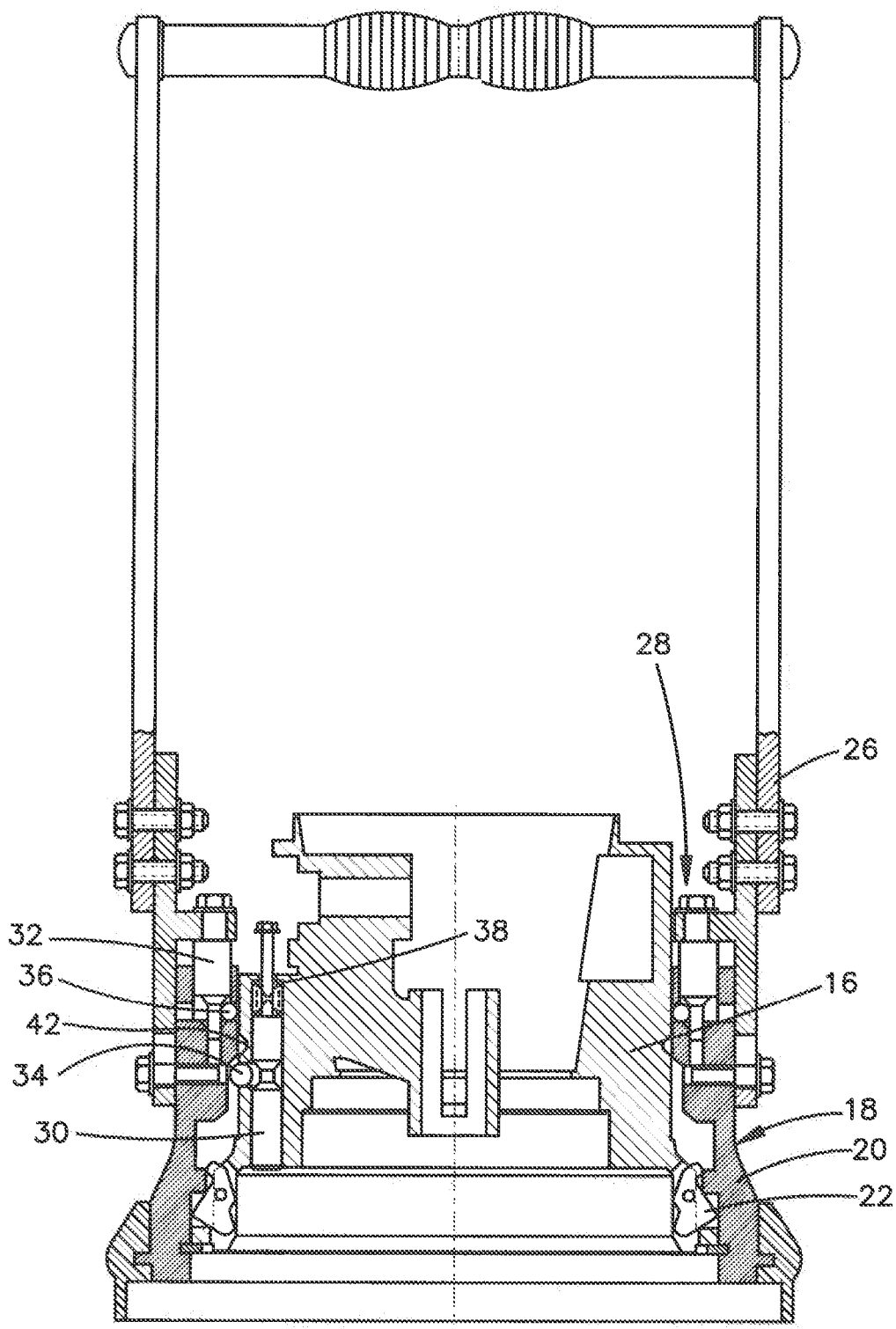
Figure 14:
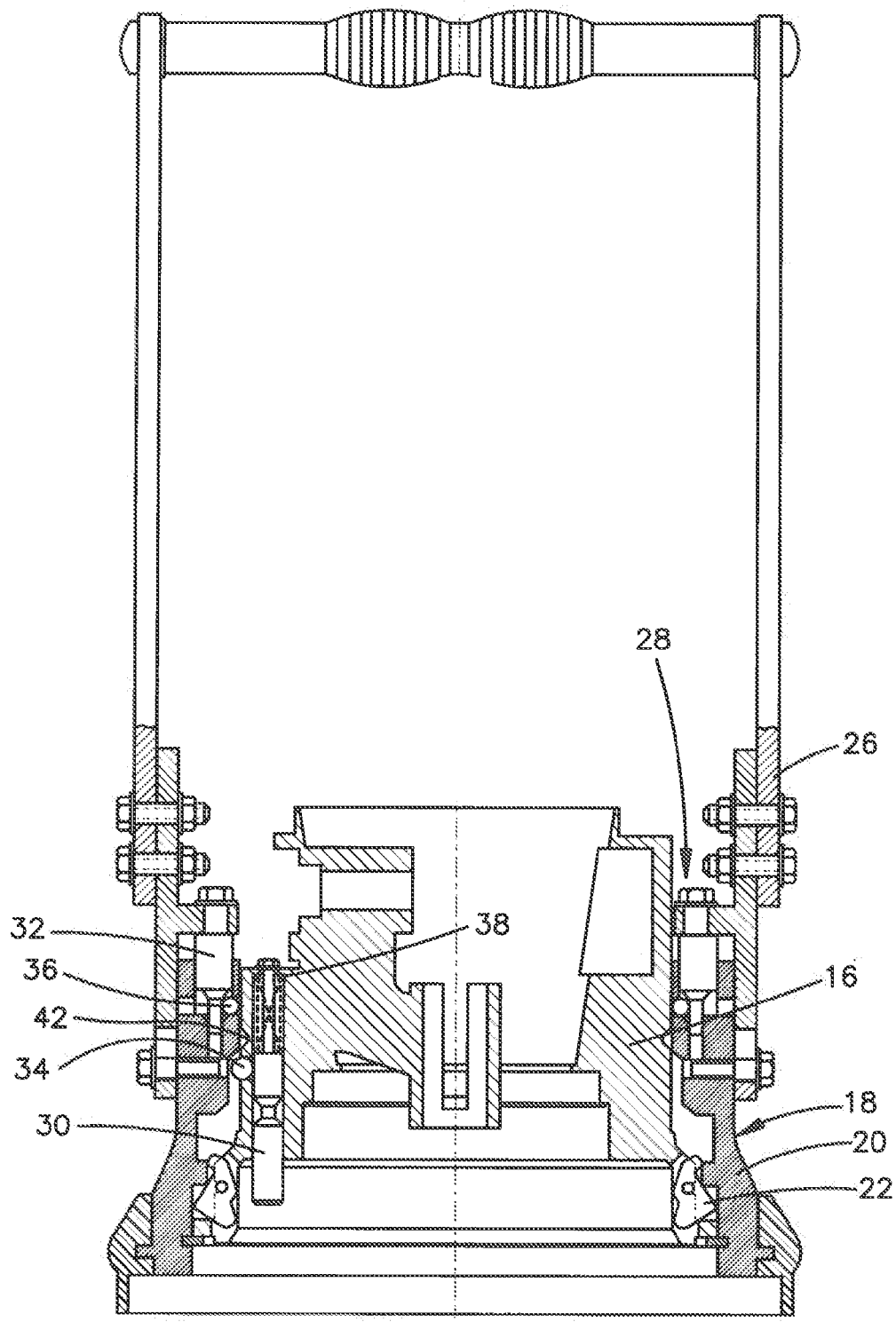

Referring to FIG. 1, a hydrant coupling assembly 10 is shown that includes a hydrant coupler 12 and a hydrant valve 14. In an embodiment of the present invention, hydrant coupler 12 includes a coupler body 16 having an axis A-A and a coupler actuating collar assembly 18 having an actuating collar 20 that is movable axially relative to the coupler body 16. The actuating collar 20 includes at least one movable latching lug 22 that is selectively rotated into place around a mating feature on a hydrant valve adapter 24 by lifting or lowering the actuating collar 20. When the actuating collar is lifted, the latching lug 22 moves into the unlatched position (e.g., FIG. 2) and when the actuating collar 20 is lowered, the latching lug 22 rotates to the latched position (e.g., FIG. 1).

Figure 15:
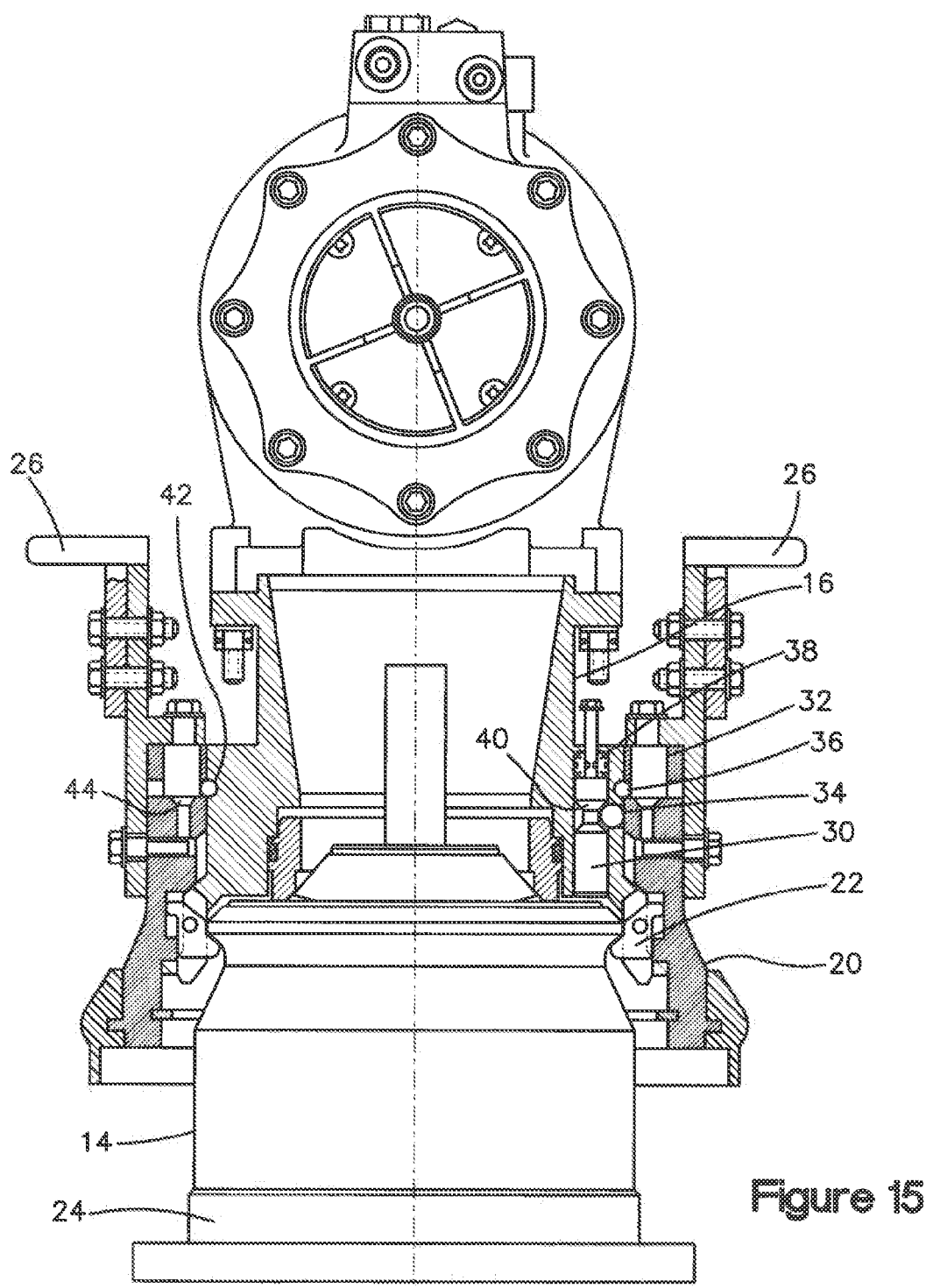
FIG. 15 is a partial cross-sectional view of a hydrant coupler according to another embodiment of the present invention.

Hydrant coupler 16 also includes a handle assembly 26 connected to the actuating collar assembly 18 to facilitate axial movement thereof. The handle assembly 26 may be configured to be gripped manually, as shown in FIG. 1, or include other interface configurations, such as the configuration shown in FIG. 15, that facilitate connection of the actuating collar assembly 18 to an automated device, such as a robotic connector/actuator.

The actuating collar assembly also includes a locking mechanism 28 that is installed internal to the coupler actuating collar 20. In an embodiment of the invention, the locking mechanism 28 includes a coupler plunger 30, a collar plunger 32, a coupler plunger check ball 34 and a collar plunger check ball 36. A resiliently compressible member 38, such as a compression spring, biases the coupler plunger 30 downward in the illustrated configuration. The coupler plunger 30 and the coupler plunger check ball 34 function to lock the actuating collar 20 in the disconnected state when raised. The collar plunger 32 and the collar plunger check ball 36 function to lock the actuating collar 20 into the connected state when lowered.

Referring to FIGS. 1, 3-8, connection of the hydrant coupling assembly will now be described. To connect the hydrant coupler 12 to the hydrant valve 14, the hydrant coupler 12 is lowered onto the hydrant valve adapter 24. The protruding coupler plunger 30 will first engage a distal surface of the hydrant valve adapter 24. The weight of the hydrant coupler 12 will compress the coupler plunger spring 38 and retract the coupler plunger 30. When the coupler plunger 30 is fully retracted into the coupler body 16, the interface between the hydrant coupler 12 and the hydrant valve 14 makes contact and the two components are in position to be connected.

The retracted coupler plunger 30 releases the coupler plunger check bail 34, which moves radially inward into a recess 40 in the coupler plunger 30 to allow the actuating collar 20 to drop under its own weight. The dropped actuating collar 20 rotates the latching lug 22 to the latched position, securing the connection between the hydrant coupler 12 and the hydrant valve 14. As the actuating collar 20 drops, it carries the collar plunger check ball 36 to a groove 42 in the coupler body 16. The weight of the lowering actuating collar handle assembly 26 causes a cam surface 44 of the collar plunger 32 to push the collar plunger check ball 36 radially inward to lock the coupler actuating collar 20 against the coupler body 16 in the latched position. In the latched position, the only way to raise the actuating collar 20 against the coupler body 16 would be to lift the collar lock operating handle assembly 26. A load applied to any other portion of the coupling assembly will fail to actuate the collar 20.

Referring to FIGS. 9-14, disconnection of the hydrant coupling assembly 10 will now be described. To disconnect the hydrant coupler 12 from the hydrant valve 14, the fueling operator (manual or robotic) lifts the collar locking operating handle 26, which unseats the collar plunger check ball 36 from the coupler body 16. As the collar plunger check ball 36 moves radially outward, it releases the actuating collar 20 from the coupler body 16. As the actuating collar 20 is released, further lifting the collar operating handle 26 raising the actuating collar 20 rotates the latching lugs 22 into the unlatched position, allowing removal of the hydrant coupler 12 from the hydrant valve 14. As the hydrant coupler 12 continues to rise away from the hydrant valve adapter 24, the plunger spring 38 biases the coupler plunger downward beyond the coupler interface. A cam surface within the recess 40 on the coupler plunger 30 moves the coupler plunger check ball 34 into a position between the coupler body 16 and the actuating collar 20 to lock the actuating collar 20 in the disconnected position.

As will be appreciated, disconnection of the hydrant coupler 12 from the hydrant valve 14 can only be achieved by lifting the handle assembly 26. Loads applied on any other portion of the hydrant coupler 12 and/or the locking mechanism 28 will not disconnect the hydrant coupler 12 from the hydrant valve 14. The locking mechanism 28 is also engaged at all times during fueling operation in compliance with aviation fueling industry requirements. However, a robotic operator is able to deactivate the locking mechanism 28, lift the actuating collar 20 and disconnect the hydrant coupler 12 from the hydrant valve 14 in one operation.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hydrant coupling assembly, comprising:
    a hydrant valve; and
    a hydrant coupler, including:
        a coupler body having an axis A-A;
        a coupler actuating collar assembly having an actuating collar movable axially relative to the coupler body, the actuating collar including at least one movable latching lug that is selectively moved into place around a mating feature on the hydrant valve by lifting or lowering the actuating collar;
        a locking mechanism installed within the coupler actuating collar, the locking mechanism including a coupler plunger, a collar plunger, a coupler plunger check ball, and a collar plunger check ball, wherein the coupler plunger and the coupler plunger check ball are adapted to lock the actuating collar in a disconnected state and the collar plunger and the collar plunger check ball are adapted to lock the actuating collar in a connected state.

2. The hydrant coupling assembly of claim 1, wherein the hydrant coupler further includes a handle assembly connected to the actuating collar assembly to facilitate axial movement thereof.

3. The hydrant coupling assembly of claim 1, wherein the hydrant coupler further includes a resiliently compressible member that biases the coupler plunger.

4. A hydrant coupler for use in a hydrant coupling assembly including a hydrant valve, comprising:
    a coupler body having an axis A-A;
    a coupler actuating collar assembly having an actuating collar movable axially relative to the coupler body, the actuating collar including at least one movable latching lug that is selectively moved into place around a mating feature on the hydrant valve by lifting or lowering the actuating collar;
    a locking mechanism installed within the coupler actuating collar, the locking mechanism including a coupler plunger, a collar plunger, a coupler plunger check ball, a collar plunger check ball, and a resiliently compressible member that biases the coupler plunger, wherein the coupler plunger and the coupler plunger check ball are adapted to lock the actuating collar in a disconnected state and the collar plunger and the collar plunger check ball are adapted to lock the actuating collar in a connected state.

5. The hydrant coupler of claim 4, further including a handle assembly connected to the actuating collar assembly to facilitate axial movement thereof.

6. The hydrant coupler of claim 4, further including a resiliently compressible member that biases the coupler plunger.

* * * * *